Oct. 20, 1936.                  J. C. LEE ET AL                  2,057,784
                            ANTIVERMIN PERCH FOR FOWLS
                               Filed Oct. 5, 1934
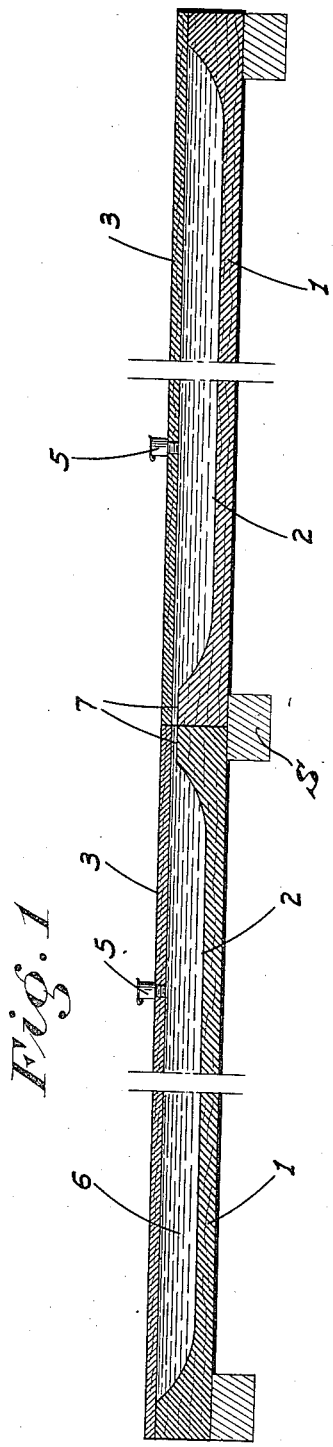
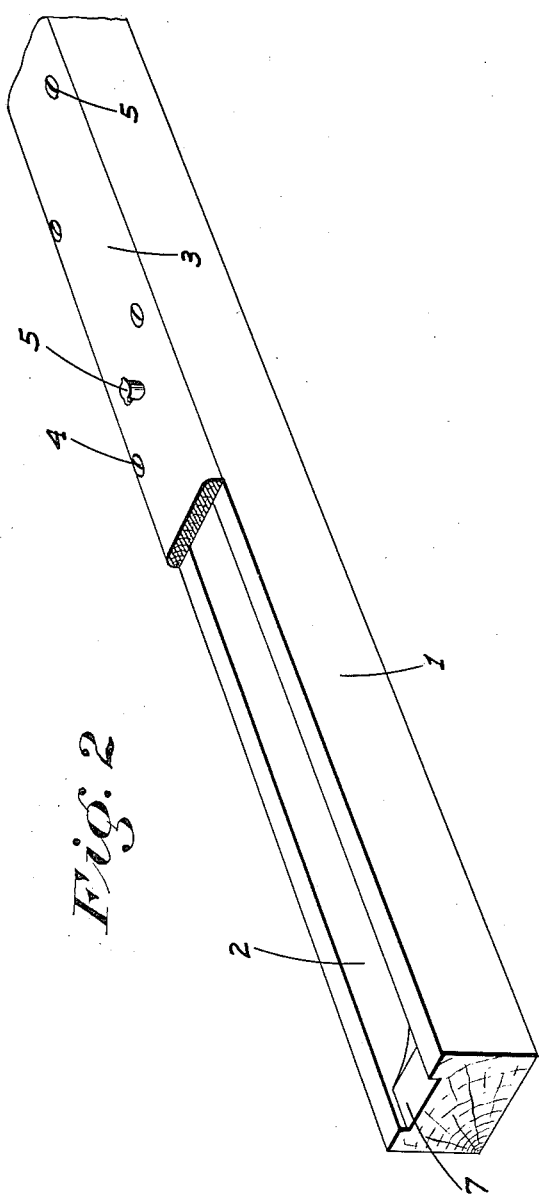
INVENTORS
J. C. Lee
W. O. Tyler
BY
ATTORNEY Patented Oct. 20, 1936

2,057,784

UNITED STATES PATENT OFFICE 2,057,784

ANTIVERMIN PERCH FOR FOWLS

Jesse C. Lee, Novato, and Wilfred O. Tyler, Sausalito, Calif.

Application October 5, 1934, Serial No. 746,994

1 Claim. (Cl. 119—25)

This invention relates to bird and poultry raising, and particularly to a means for combatting lice and like vermin with which the birds and their roosting places are apt to be infested. As is well known, these lice, which are very small, not only live and breed on the birds themselves, but accumulate in large numbers on the perches, from which they pass to the birds roosting thereon so that even if the birds themselves are initially perfectly clean they will soon become infested by the vermin from the perches. Frequent disinfecting must therefore be resorted to in order to keep the perches free from vermin, and this is a time-taking and relatively expensive operation which if neglected has disastrous consequences.

It is therefore the principal object of our invention to provide a roosting perch for the birds so constructed that not only is the perch itself destructive to any vermin alighting or attempting to congregate thereon, but the heat generated from the bodies of the roosting birds will cause a vermin destroying gas or vapor to emanate from the perch. This gas of course will penetrate through the feathers to the skins of the birds and will ultimately kill any vermin living thereon. The vermin destroying action of the perch is therefore automatic, and no attention need be given the same in order for it to maintain this desired property, except a few seconds at widely separated intervals, even in very hot and dry weather.

These objects we accomplish by means of such structure and relative arrangement of parts as will fully appear by a perusal of the following specification and claim.

In the drawing similar characters of reference indicate corresponding parts in the several views:

Fig. 1 is a sectional elevation of a pair of perch sections assembled together and partly broken away.

Fig. 2 is a fragmentary perspective view of a perch section partly broken away.

Referring now more particularly to the characters of reference on the drawing, our improved perch, for hen or poultry house use, is preferably built up of a number of separate sections adapted to be placed in close abutting longitudinal alinement so as to provide the necessary total length for the perch without having to make the same in single lengths, which would be hard to handle.

Each section comprises a substantially square length 1 of porous wood such as white pine, formed with a longitudinal deep trough 2 cut down from the top and extending nearly the full length of the section. After the trough is formed it is permanently closed by a relatively thin cover strip 3 of the same material, secured in place by screws 4 or the like. This is the present and preferred method of construction and is very simple and cheap to manufacture.

Each section has a filler tube 5 secured in the cover strip to communicate with the trough, this tube being preferably of the spring-cap type commonly used for supplying oil in small quantities to machine parts.

The enclosed trough, which of course forms a chamber inside the perch section, is filled with a relatively strong solution 6 of a suitable insecticide such as an approximately 30% solution of nicotine sulphate. In a very short time, the solution permeates the wood so that the entire perch becomes saturated. Not only therefore is the perch itself vermin destroying, but the birds roosting thereon will cause a certain amount of vapor to be generated from the exuding solution, which will penetrate to the skins of the birds and effectively kill all lice thereon. Since this killing treatment takes place every time the birds roost the birds will very soon be free of all vermin with which they may have been infested and no fresh quantities will breed or accumulate.

From actual experience with our perch we have found that a single filling of the trough, which is approximately one inch square, is sufficient for about two months' use before becoming depleted. To insure against such complete depletion however it is better to inject a little of the solution into the trough every now and then through the filler trough 5.

If a single length or section of the perch is all that is to be used, the cover 3 makes a tight fit with the main perch member 1 transversely thereof at both ends as well as along the sides throughout its length. If, however, two or more sections are to be placed together to form a continuous perch unit, as shown in Fig. 1, the members 1 are cut down at their adjacent ends for a short distance as at 7, so as to provide for covered communication between the troughs of the adjacent sections. By so doing it is only necessary to supply the solution to the trough of one section to fill the same, since when said one trough is full it will overflow into the adjacent one.

Since it is of course desirable that the saturation and gas generating properties of the perch shall be maintained the same throughout its length it is necessary in installing the perch to see that it is set truly level so that the liquid solution inside will be equally distributed along the trough from end to end.

While we have here shown and described the perch as being of a type particularly adapted for use in poultry houses, the same principle of construction may obviously be incorporated in small perches either of the stationary or swinging type such as are used in aviaries or pet bird cages whose occupants are also subject to attacks by vermin.

The support S, beneath the abutting ends of the lengths of wood which comprise the perch, assures that the shallow passages in adjacent ends of said lengths of wood remain in register and, in turn, the support S is disinfected by means of the small amount of liquid disinfectant which will flow down between the abutting ends when the liquid is flowing through the said shallow passages.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described our invention what we claim as new and useful and desire to secure by Letters Patent is:

A perch for birds comprising a plurality of lengths of porous wood square ended at adjacent ends and disposed in end to end abutting relation, a support under such abutting ends, upwardly opening troughs formed in said lengths of wood and terminating short of the ends thereof, abutting cover strips secured to the lengths of wood over the troughs, and shallow passages cut down below the strips and beyond the troughs only at adjacent ends of the lengths of wood whereby to place the troughs of the separate lengths of wood in communication with each other.

JESSE C. LEE.
WILFRED O. TYLER.